No. 770,443. PATENTED SEPT. 20, 1904.
C. M. RHODES.
HUB CLUTCH.
APPLICATION FILED JUNE 11, 1903.
NO MODEL.

Witnesses:
Geo. B. Rowley
A. H. Button

Inventor:
Chas. M. Rhodes,
By N. C. Everts Co.
Attorneys.

No. 770,443. Patented September 20, 1904.

UNITED STATES PATENT OFFICE.

CHARLES M. RHODES, OF STEUBENVILLE, OHIO, ASSIGNOR TO THE RHODES MANUFACTURING COMPANY, OF STEUBENVILLE, OHIO, A CORPORATION OF OHIO.

HUB-CLUTCH.

SPECIFICATION forming part of Letters Patent No. 770,443, dated September 20, 1904.

Application filed June 11, 1903. Serial No. 161,029. (No model.)

*To all whom it may concern:*

Be it known that I, CHARLES M. RHODES, a citizen of the United States of America, residing at Steubenville, in the county of Jefferson and State of Ohio, have invented certain new and useful Improvements in Hub-Clutches, of which the following is a specification, reference being had therein to the accompanying drawings.

This invention relates to certain new and useful improvements in hub-clutches for bicycles, and relates particularly to that class of devices which may be operated by a slight back pedaling to throw the brake into braking engagement and again by a forward pedaling to clutch the driving mechanism.

Another object of my invention is to provide mechanism in connection with the hub of the bicycle whereby a positive movement of the wheel will be accomplished by pedaling in one direction and by stopping and pedaling in a reverse direction the means carried by the mechanism will engage the hub of the wheel which rotates freely on the spindle and brake the same.

Another object of my invention is to provide a hub-clutch of such construction that the same may be easily operated, strong and durable, highly efficient in use, and comparatively inexpensive to manufacture.

A further object is to provide a device of this character in which all the mechanism carried upon the hub and all wearing parts are effectually protected from dust and dirt which may accummulate during the use of the machine.

In describing the invention in detail reference is had to the accompanying drawings, forming a part of this specification, and wherein like numerals of reference indicate like parts throughout the several views, in which—

Figure 1:
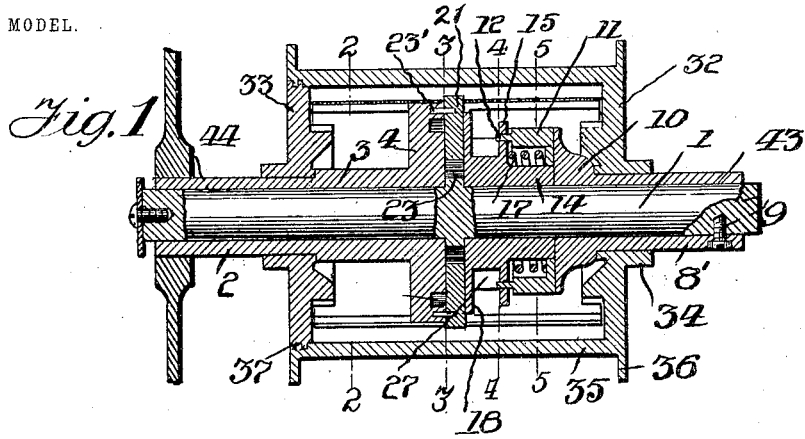
Figure 2:
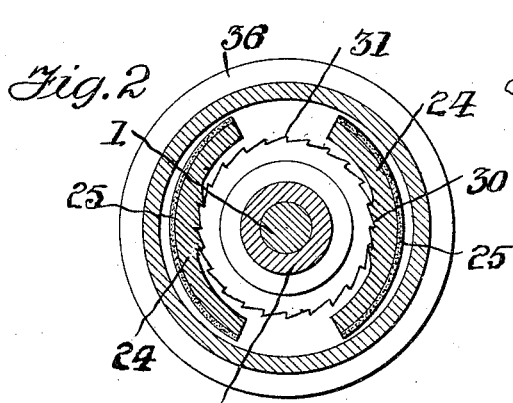
Figure 3:
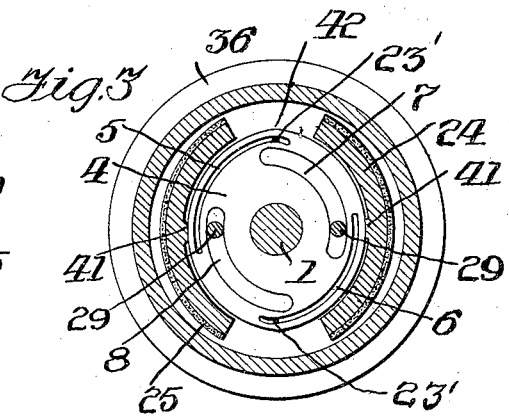
Figure 4:
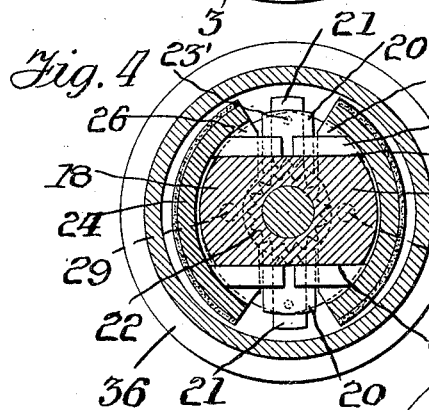
Figure 5:
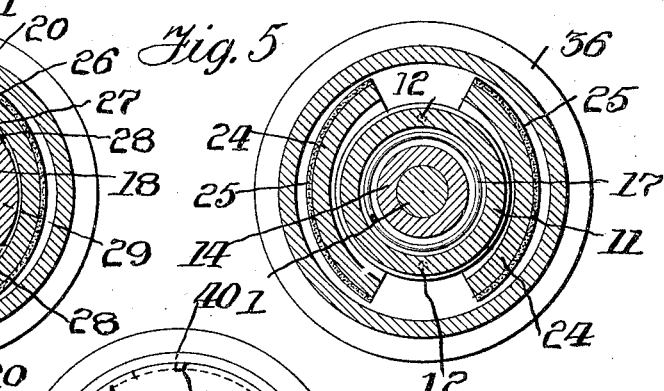
Figure 6:
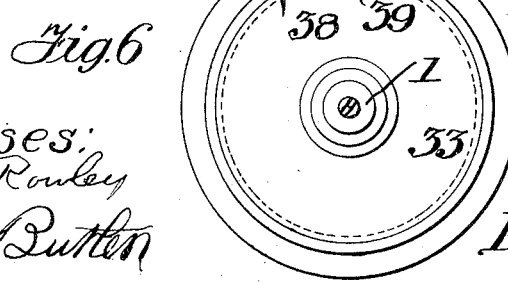

Figure 1 is a longitudinal sectional view of the spindle and hub portion of the rear wheel of a bicycle, the wheel not shown. Fig. 2 is a cross-section taken on line 2 2 of Fig. 1. Fig. 3 is a similar view on line 3 3 of Fig. 1. Fig. 4 is a similar view on the line 4 4 of Fig. 1. Fig. 5 is a like view on the line 5 5 of Fig. 1, and Fig. 6 is an end view showing the bayonet-lock securing the caps in position upon the spindle.

To put my invention into practice I provide a spindle or shaft 1, which is adapted to support the rear wheel (not shown) of a bicycle. Upon this shaft 1 is secured a sleeve 2, which has its forward end enlarged, as indicated at 3, and formed integral with this enlarged portion is the large cam-shaped head 4, and in its outer face, preferably near the periphery thereof, are formed the slots 5 and 6, said slots being diametrically opposite each other and each of said slots extending a quarter of the circumference of the cam. Also formed in the face of this cam are the slots 7 and 8, which are formed between the slots 5 and 6 and the central opening of the sleeve, these slots being diametrically opposite each other and occupying a quarter of the circumference of the cam.

Secured upon the other end of the shaft 1 is a collar 8', which is secured thereon by means of a screw 9, and formed integral with the collar 8' is the enlarged annular head 10, which bears against the annular collar 11. This collar carries the extending pins 12, the object of which will be hereinafter described. Also seated upon the shaft 1 and revoluble thereon is the collar 14, which projects into the annular recess formed by the annular collar 11, this collar carrying the annular extending flange 15, having apertures formed therein to receive the pins 12, whereby the same is prevented from rotating independently of the annular collar 18, it being understood that the collar 11 is mounted on the collar 14 and that collar 14 is free to revolve on the shaft 1. Mounted between the rear wall 16 of the annular collar 11 and the extending flange 15 is a spiral spring 17, which normally forces the collar 14 outwardly, the object of which will be hereinafter described. Formed integral with the collar 14 is a projecting lug or lugs 18, which are cut away, as indicated at 19, to receive the blocks 21, sliding in ways 20, each of said blocks having teeth formed on their inner ends, as indicated at 22, and each of said blocks carry projecting pins 23', engaging cam-slots 5 and 6 in cam-disk 4.

Formed integral or secured to the shaft 1 is toothed wheel 23, adapted to engage teeth on the inner ends of block 21, as heretofore described. These sliding blocks 21 are adapted to lie in close engagement with the cam 4, and the pins 23' are adapted to engage in the slots 5 and 6, formed in the face of the cam, and the object of the spiral spring 17, heretofore mentioned, is to normally keep these pins in engagement with said slots.

The clutch mechanism is composed of two segmental-shaped shells 24, and upon the outer periphery of these shells is secured a piece of leather 25, whereby a better clutching surface is provided than where the ordinary metallic surface is used, and upon the interior of these clutch members, and preferably near the center thereof, is formed a collar 26, which carries the pins 27, said pins being adapted to engage upon the faces 28 of the lugs 18. This collar also carries the pins 29, which extend in alinement with the axis of the hub and engage in the slots 7 and 8, formed in the face of the cam 4.

Formed upon the interior of each of the clutch sections or members 24, and preferably near the outer edge, are a series of teeth 30, which are adapted to engage a ratchet-wheel 31, formed integral with the caps 32 and 33. The cap 33 carries a collar 34 and is secured upon the sleeve 8', carried by the shaft 1. Formed integral with the cap 32 is the exterior casing 35, which is annular in form and carries the extending flanges 36 upon its ends, said flanges being adapted to receive the spokes of the wheel. (Not shown.) The cap 33 is removable and when in position is secured there by the screw-threads 37. Instead of this screw-threaded connection I may employ a bayonet connection, as illustrated in Fig. 6 of the drawings, wherein I provide a slot 38, which is adapted to receive a pin 39, carried by the cap 33, a slot 40 being provided in the annular casing 35, through which the pin 39 is inserted until the same engages the slot 38, carried in the annular shell 35, whereby the cap may be slightly rotated until the pin 39 has become engaged in the slot 38, when the same will be rigidly secured in position.

It will be seen in Fig. 3 of the drawings that the clutch members 24 have an enlarged portion 41 formed centrally of the interior surface of the members and adjacent to the collar 26, formed centrally thereof. These enlarged portions are adapted to engage the points 42 of the head 4, the object of which will be described in the operation.

The operation of the clutch-hub is as follows: As heretofore stated, when it is desired to apply the brake upon the hub a slight back pedaling is required—that is, the operator stops pedaling and slightly reverses the direction of the pedals, whereby the clutch is operated which brakes the wheel. To accomplish this, I secure the end of the spindle, as indicated by reference-numeral 43, in a fixed position upon the frame or the rear forks of the wheel, and upon the sleeve 2, as indicated at 44, I secure the ordinary sprocket. We will assume that the bicycle is going forward and it is desired to continue in this direction without pedaling. The operator by slightly moving or stopping the pedals disengages the ratchet-wheel 31 from the teeth 30, carried upon the interior periphery of the clutch members 24. When the pedals are being operated these teeth are normally in engagement with the ratchet-wheel, whereby the hub and clutch members revolve with the sleeve 2, and upon the operator stopping pedaling the teeth 30 move over ratchet-wheel 31, whereby a continued forward movement of the wheel is accomplished without the operator pedaling the bicycle. It being desired to apply the brake, the pedals are slightly reversed, whereby the cam 4 is partially rotated, which forces the clutch member 24 outwardly against the interior periphery of the hub and brakes the same. To further lock this brake in position, the cam, through the medium of the pin 23', forces the sliding lugs 21, carrying teeth upon their lower end, in engagement with the toothed wheel 22, carried by the spindle 1 of the hub, whereby a more positive lock for the clutch members 24 against the interior periphery of the hub is accomplished. The sleeve 8 being fixed in one side of the forks of a bicycle, the head 10 of the sleeve 8 is held stationary and the annular collar 11 revolves upon the spindle or shaft 1, and revolving with the annular collar 11 by means of the extending pins 12 the member 14 also revolves, which causes the clutch members 24 to revolve by means of the extending lugs 27 of the collar 26 being in engagement with members 18 of the member 14.

It is thought from the above description of the operation that the movements of my improved hub-clutch will be readily understood, and it will be noted that I do not care to limit myself to the exact above construction, but may make various changes in the details of construction without departing from the general spirit of the invention.

Having fully described my invention, what I claim as new, and desire to secure by Letters Patent, is—

1. In a clutch mechanism, the combination with a hub 35, a shaft 1 fixed in the frame of the vehicle, a sleeve 3 loosely mounted on said shaft, a cam-disk 4 carried by said sleeve and provided with cam-slots 5 6 and 7 8, a pair of shoes 24 24 having teeth 30 on their inner surfaces and carrying pins 29 29 engaging with slots 7 and 8 of said shaft, a rotatable member 14 mounted on said shaft, a head 10 rigidly secured on the shaft, a collar 11 carried by the rotatable member 14 and having pins engaging said rotatable member, of sliding blocks 21 guided in ways on said rotatable member 14 and having pins 23' 23' adapted to engage slots 5 6 formed in the said cam-disk, and teeth upon their inner ends, a toothed wheel upon said shaft with which the teeth on the sliding blocks engage, ratchet-wheels 31 31 secured to the hub the teeth on said shoes engaging with the ratchet-wheels carried by said hubs, substantially as described.

2. In a device of the character described, the combination with a hub, end caps carried by said hub and having toothed wheels on their inner faces, a stationary shaft mounted in the frame of the vehicle, a sleeve loosely mounted on said shaft, a cam wheel or disk carried by said sleeve and provided with cam-slots, a head mounted upon the end of the shaft opposite said sleeve, a rotatable collar bearing against said head, and a rotatable member connected to said rotatable collar, of sliding blocks working in ways in said rotatable member and provided with pins adapted to engage the cam-slots in said cam-disk and having teeth on their inner ends adapted to engage teeth on said shaft, shoes having inwardly-extending lugs and pins thereon adapted to engage slots in the said cam-disk, said shoes having teeth adapted to engage the ratchet-wheels carried by the hub-caps, substantially as described.

3. In a device of the character described, the combination with a hub, of end caps, toothed wheels formed on the inner faces of said end caps, a stationary shaft, a sleeve mounted loosely thereon, a cam-disk carried by said sleeve, a rotatable member mounted on the shaft, sliding blocks carried by said member, said blocks carrying pins engaging in slots in said cam-disk and having teeth on their inner ends, a toothed wheel on said shaft adapted to engage with the teeth on said block, shoes movably mounted on said rotatable member, means carried by said rotatable member for spreading the shoes apart, means for limiting the spreading movement of the shoes, and means for holding the rotatable member in engagement with the cam-disk, substantially as described.

4. In a device of the character described, the combination with a hub, of end plates, toothed wheels on the inner faces of said plates, a stationary shaft, a sleeve mounted loosely upon said shaft, a cam-disk carried by said sleeve and formed with slots, a head mounted upon the other end of said shaft, a rotatable collar bearing against said head, a rotatable member mounted upon the shaft and connected to said collar, expanding shoes mounted on said rotatable member, a spring arranged between said rotatable collar and said rotatable member to hold the latter in engagement with the cam-disk, pins arranged on the rotatable member engaging slots formed in the cam-disk, said shoes having teeth upon their inner surfaces adapted to engage the toothed wheels on the end plates and being provided with pins engaging in slots in the cam-disk, substantially as described.

5. In a device of the character described, the combination of a shaft, a sleeve loosely mounted on the shaft, a cam-disk carried by said sleeve, a toothed wheel carried by the shaft, a hub and caps on each end of the hub having toothed wheels on their inner surfaces, with a head mounted rigidly on the shaft, a collar bearing against said head, a rotatable flanged member slidably mounted on said shaft, and engaged by pins on said collar, lugs formed on said rotatable member, blocks sliding in ways in said lugs and provided with teeth on their inner ends, a toothed wheel on the shaft adapted to be engaged by the teeth on said blocks, pins in said blocks working in grooves in said cam-disk, and segmental shells slidably mounted on said rotatable member and having teeth on their inner surfaces adapted to engage the toothed wheels on the end caps of the hubs, and pins working in slots in the cam-disk, substantially as described.

In testimony whereof I affix my signature in the presence of two witnesses.

CHARLES M. RHODES.

Witnesses:
M. S. GILLETT,
HUGH P. McGOWAN.